United States Patent
Sim et al.

(10) Patent No.: US 9,800,277 B2
(45) Date of Patent: Oct. 24, 2017

(54) INTERFERENCE DETECTION AND MITIGATION IN RADIO FREQUENCY RECEIVERS

(71) Applicant: MOTOROLA SOLUTIONS, INC., Schaumburg, IL (US)

(72) Inventors: Moh Lim Sim, Bayan Lepas (MY); Chow Loong Cheah, Ipoh (MY); Shu Chen, Chengdu (CN); Raviteja Chinta, Pompano Beach, FL (US); Yadunandana N Rao, Sunrise, FL (US); V. C. Prakash V K Chacko, Gelugor (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/913,691

(22) PCT Filed: Oct. 11, 2013

(86) PCT No.: PCT/CN2013/085054
§ 371 (c)(1),
(2) Date: Feb. 23, 2016

(87) PCT Pub. No.: WO2015/051535
PCT Pub. Date: Apr. 16, 2015

(65) Prior Publication Data
US 2016/0211872 A1    Jul. 21, 2016

(51) Int. Cl.
*H04B 1/10* (2006.01)
(52) U.S. Cl.
CPC ... *H04B 1/1027* (2013.01); *H04B 2001/1054* (2013.01)

(58) Field of Classification Search
CPC ........ H04B 1/00; H04B 1/0003; H04B 1/007; H04B 1/707; H04B 1/7079; H04B 1/1027;
(Continued)

(56) References Cited

U.S. PATENT DOCUMENTS 6,400,217 B1    6/2002  Bhandari
7,109,778 B2    9/2006  Ohtani et al.
(Continued)

FOREIGN PATENT DOCUMENTS

| CN | 1992536 A | 7/2007 |
| CN | 102469055 A | 5/2012 |
| EP | 1339166 B1 | 6/2008 |

OTHER PUBLICATIONS

International Search Report and the Written Opinion, PCT/CN2013/085054, filed Oct. 11, 2013, dated Jul. 15, 2014, all pages.

*Primary Examiner* — Thanh Le
(74) *Attorney, Agent, or Firm* — Barbara R. Doutre

(57) ABSTRACT

A radio frequency (RF) receiver and method of controlling an RF receiver are provided. The method includes receiving an RF signal and down-converting the RF signal to a substantially baseband signal. A direct current (DC) transition is detected in a portion of the substantially baseband signal. The substantially baseband signal is then filtered using a first filter configuration at the portion of the substantially baseband signal including the DC transition and a second filter configuration at a portion of the substantially baseband signal not including the DC transition.

18 Claims, 6 Drawing Sheets

(58) Field of Classification Search
CPC ............ H04B 2001/1054; H04W 4/08; H04W 72/048; H04L 1/0045; H04L 5/0016; H04L 25/06; H04L 25/067; H04L 27/02; H04L 27/06; H04L 27/08
See application file for complete search history.

(56) References Cited

U.S. PATENT DOCUMENTS

| | | |
|---|---|---|
| 7,773,967 B2 | 8/2010 | Smith |
| 2003/0025623 A1* | 2/2003 | Brueske ............... H04B 1/0003 341/139 |
| 2003/0063690 A1 | 4/2003 | Paulus et al. |
| 2005/0163197 A1* | 7/2005 | Cleary ................. H04B 1/7097 375/147 |
| 2006/0239388 A1 | 10/2006 | Beamish |
| 2009/0088106 A1 | 4/2009 | Hwang et al. |
| 2009/0185639 A1 | 7/2009 | Han et al. |
| 2015/0017941 A1* | 1/2015 | Doberstein ........... H04L 25/067 455/296 |

* cited by examiner

INTERFERENCE DETECTION AND MITIGATION IN RADIO FREQUENCY RECEIVERS

BACKGROUND

Direct Conversion Receivers (DCR) and Very Low Intermediate Frequency (VLIF) receivers are popular due to their relatively low cost and small size, as well as their ability to operate over a broad range of frequencies. These receivers combine a received radio frequency (RF) signal with a local oscillator signal prior to analogue to digital conversion.

In DCR, the local oscillator is set at the frequency of the RF signal to enable down converting of the RF signal directly into a baseband signal.

In VLIF receivers, the local oscillator is set at a frequency close to that of the RF signal, but differing by an offset that is referred to as an intermediate frequency. For example, the intermediate frequency is typically between 3.6 kHz to 5.7 kHz, depending on channel spacing. The local oscillator in the VLIF receiver thus operates at a frequency either just above or just below the frequency of the RF signal, i.e., on one "side" of the RF signal, and down converts the RF signal into a substantially baseband intermediate frequency signal.

In both DCR and VLIF receivers, the down converted RF signal comprises an in-phase component, I, and a quadrature component, Q. Often during down conversion, noise, distortion or imbalance is introduced into, or pronounced in, the I and Q components. For example, interferers, such as strong digital mobile radio (DMR) interferers, can generate undesired direct current (DC) transitions in the signal during down conversion. Such interference is known as chopper noise and can degrade the blocking performance of the receiver.

Accordingly, there is a need for improved interference detection and mitigation in RF receivers.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
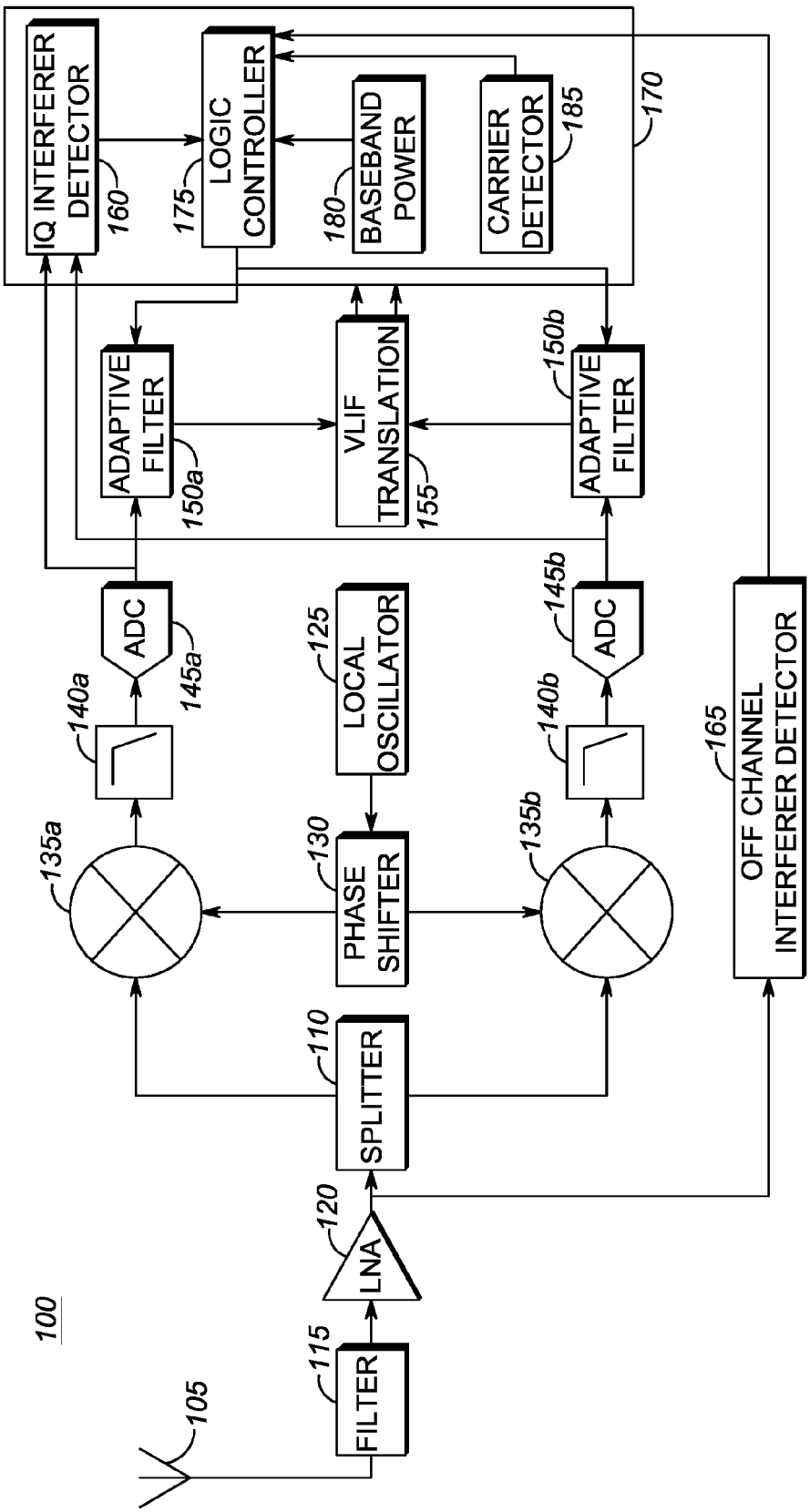
FIG. 1 is block diagram of an RF receiver, according to an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus (receiver) and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to certain embodiments, the present invention resides in a method of controlling a radio frequency (RF) receiver, the method comprising: receiving an RF signal; down-converting the RF signal to an intermediate frequency (IF) to produce an IF signal; detecting one or both of an off-channel interference signal in the RF signal and a direct current (DC) shift in the IF signal; determining a first filter setting according to the detected one or both of the off-channel interference signal and the DC shift; and filtering the IF signal using the first filter setting Advantages of certain embodiments of the present invention include faster and more reliable detection of interferers. In particular, certain embodiments provide improved methods of quickly and reliably detecting DC distortion, such as DC jumps or transitions.

Further advantages of certain embodiments of the present invention include an improved ability to detect low power interferer signals, detect DC distortion and/or remove or mitigate DC distortion.

FIG. 1 is block diagram of an RF receiver 100, according to embodiments of the present invention. In various embodiments, the RF receiver may be a very low intermediate frequency (VLIF) receiver, a direct conversion receiver (DCR), and/or a zero intermediate frequency receiver.

The RF receiver 100 includes an antenna 105 that is configured to receive an RF signal. The antenna 105 is coupled to a splitter 110 via a filter 115 and a low noise amplifier (LNA) 120. The splitter 110 splits the RF signal into an in-phase signal and a quadrature signal, for extracting an in-phase component, I, and a quadrature component, Q, of the RF signal.

The I and Q components are extracted using a local oscillator 125 that is configured to down-convert the RF signal to a substantially baseband signal, namely an IF signal. In particular, the local oscillator 125 generates a reference signal, which is added to the in-phase and quadrature signals. The reference signal is phase shifted 90 degrees by a phase shifter 130 before being added to the quadrature signal using a first mixer 135a. The reference signal is then added to the in-phase signal without phase shift, i.e., shifted by 0 degrees, by a second mixer 135b. The I and Q components of the IF signal are filtered by low-pass filters 140a,140b and digitized by analogue to digital converters (ADC) 145a,145b to generate samples of the I and Q components.

The digital I and Q components are filtered by adaptive filters 150a,150b coupled to the ADCs 145a,145b to produce a filtered IF signal comprising a filtered I component and a filtered Q component. The filtered IF signal is then down-converted to a baseband signal by a VLIF translation module 155. The baseband signal is then provided to a digital signal processor (DSP) 170.

An off-channel interferer detector 165 is coupled to the LNA 120 to receive the RF signal. The off-channel interferer detector 165 comprises a broadband power detector to detect a power level of the RF signal. The off-channel interferer detector 165 is configured to detect an off-channel interference signal. In particular, the off-channel interferer detector 165 detects when a power of the off-channel interference signal is greater than a power threshold. The output of the off-channel interferer detector 165 is high when a power or energy of the RF signal exceeds the power threshold. The output of the off-channel interferer detector 165 is low when the power or energy of the RF signal is below the power threshold. Off-channel interferers, such as those detected by the off-channel interferer detector 165, can generate DC transitions in the substantially baseband signal.

The DSP 170 comprises an interferer detector module 160 coupled to the ADCs 145a, 145b to detect DC transition or shift in a portion of the substantially baseband signal, as described further below. The DSP 170 comprises a logic controller module 175 coupled to the adaptive filters 150a, 150b, the off-channel interferer detector 165 and the interferer detector module 160. The logic controller module 175 is configured to control the adaptive filters 150a, 150b. The logic controller module 175 determines a first filter setting according to the detection of one or both of an off-channel interference signal detected by the off-channel interferer detector 165 and a DC transition or shift detected by the interferer detector module 160. The logic controller module 175 configures the adaptive filers 150a, 150b to filter the IF signals using the first filter setting. When an off-channel interference signal and a DC transition or shift are not detected, the logic controller module 175 configures the adaptive filters 150a, 150b to filter the IF signal using a second filter setting.

The DSP 170 further comprises a baseband power module 180 to measure a power of at least part of the IF signal, and a carrier detector module 185 to detect the presence of a carrier in the RF signal. The logic controller module 175 can further determine the first filter setting according the measured power and/or the presence of the carrier.

In an alternate embodiment (not shown) the DSP 170 further includes the VLIF translation module 155, the off-channel interferer detector 165 and/or the adaptive filters 150a, 150b.

The logic controller module 175 configures the adaptive filters 150a, 150b to operate in a first filter configuration, such as the first filter setting, at the portion of the substantially baseband signal including the DC transition and sets the adaptive filters 150a, 150b to operate in a second filter configuration, such as the first filter setting, at a portion of the substantially baseband signal not including the DC transition.

The adaptive filters 150a, 150b can comprise adaptive high pass filters. In such case, the first filter setting and/or the second filter setting comprises one or more of a cutoff frequency, an order, a gain, and a structure of a high-pass filter. The first filter setting typically has one or more of a higher cutoff frequency and a higher attenuation at DC than the second filter setting.

In one embodiment, the adaptive filters are selected from a plurality of cascaded infinite impulse response (IIR) filters. In such case, filtering the IF signal using the first filter setting comprises filtering the IF signal with a first set of cascaded IIR filters from the plurality of cascaded IIR filters and filtering the IF signal using the second filter setting comprises filtering the IF signal with a second set of cascaded IIR filters from the plurality of cascaded IIR filters.

In one embodiment, the logic controller module 175 controls the adaptive filters 150a, 150b according to a signal of the interferer detector module 160 and not according to a signal of the off-channel interferer detector 165. In another embodiment, the logic controller module 175 controls the adaptive filters 150a, 150b according to a signal of the off-channel interferer detector 165 and not according to a signal of the interferer detector module 160.

Figure 2:
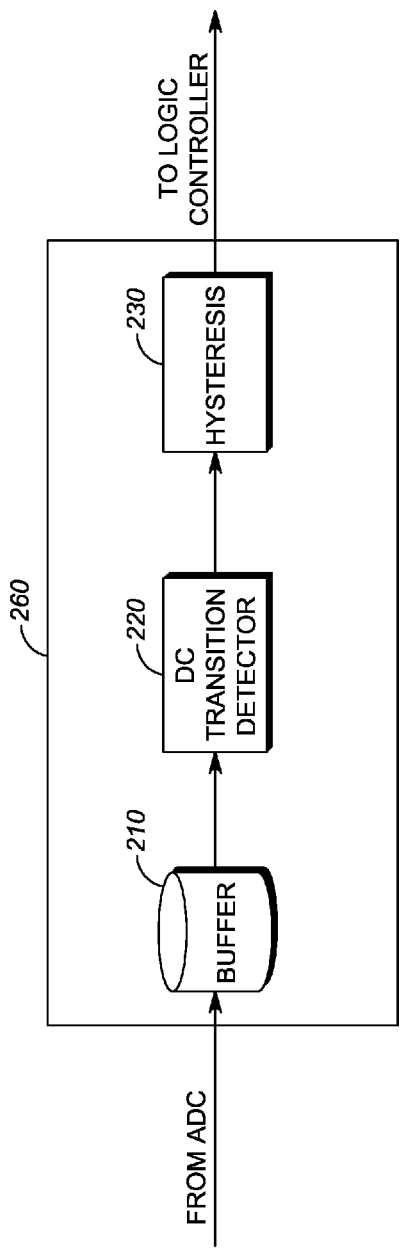
FIG. 2 is a block diagram of an interferer detector module, according to an embodiment of the present invention.

FIG. 2 is a block diagram showing an interferer detector module 260 for use in an RF receiver, such as the RF receiver 100, according to an embodiment of the present invention. The interferer detector module 160 can be similar or identical to the interferer detector module 260. The interferer detector module 260 comprises a buffer 210 for storing samples of the digital I and Q components of the substantially baseband signal. According to some embodiments, the buffer comprises 100 samples, wherein the 100 samples correspond to 2.5 ms of analog signal.

The interferer detector module 260 comprises a DC transition detector module 220 coupled to the buffer 210 to detect DC transitions in the I and Q components of the substantially baseband signal. The DC transition detector module 220 determines a DC component of the substantially baseband signal for sets of samples, and detects DC transitions or shifts from changes in the DC component between subsequent sets of samples. For example, according to some embodiments the sets of samples comprise 25 samples.

The interferer detector module 260 further comprises a hysteresis module 230 coupled to the DC transition detector module 220. The output of the hysteresis module 230 is set to high for samples where a DC transition is detected by the DC transition detector module 220, and is set to low for samples where no DC transition is detected by the DC transition detector module 220.

Figure 3:
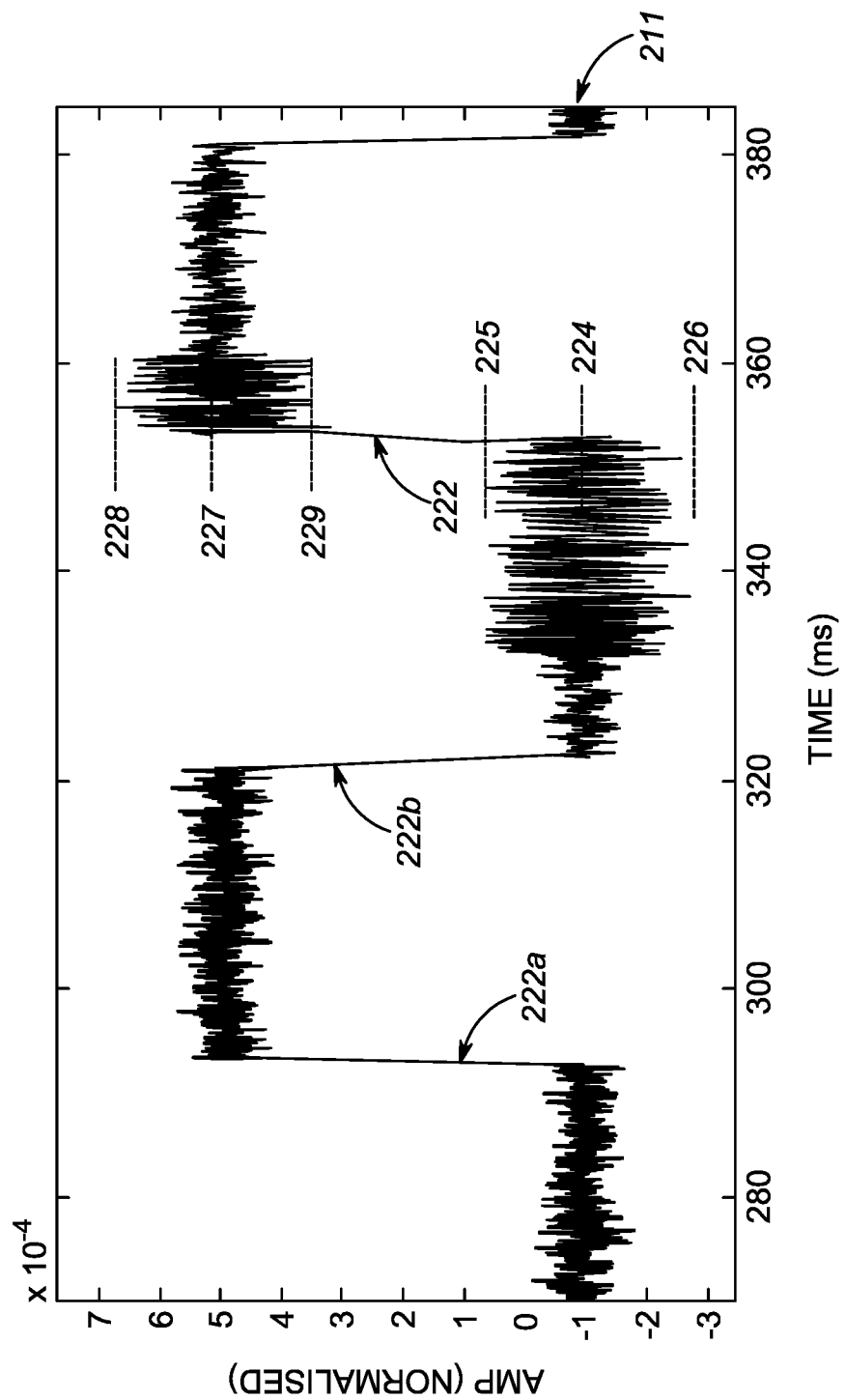
FIG. 3 is a graph of an exemplary substantially baseband current signal comprising DC transitions, according to an embodiment of the present invention.

FIG. 3 is a graph of an example of a substantially baseband current signal 211 comprising DC transitions 222, 222a, 222b, according to an embodiment of the present invention.

The DC transition detector module 220 detects a DC transition or shift when a transition in a DC component 224, 227 of the substantially baseband signal 211 is greater than one or more thresholds. The DC component of the substantially baseband signal 211 can be determined from a mean of the in-phase and/or the quadrature component of the substantially baseband signal. The DC transition 222 in FIG. 3 is determined from the difference between a DC component 227 after the DC transition 222 and a DC component 224 before the transition 222.

The one or more thresholds can comprise a predefined shift threshold and/or a dynamically defined threshold. The shift threshold can be defined according to the properties of the receiver and/or as a calibration parameter. The dynamically defined threshold can be defined according to a range or a variance in a non-transitional portion of the substantially baseband signal 211. In some embodiments, the dynamically defined threshold includes a scaling factor for calibration. The range is determined from a difference between a maximum amplitude component 225, 228 and a minimum amplitude component 226, 229 of an in-phase component or a quadrature component in the non-transitional portion of the substantially baseband signal.

In one embodiment, the DC transition or shift is detected in each of the in-phase components and/or the quadrature components of the substantially baseband signal.

Exemplary pseudocode for use in the DC transition detector module 220 module is provided below, wherein o_jump-Detected is the output of the DC transition detector module, DCJUMP_MIN_DC_TH is the predefined threshold, DCJUMP_SENSITIVITY is a predefined parameter used for calibration of the dynamically defined threshold, t_delta is the magnitude of the DC transition, and m_envA and t_envA are the ranges of the signal before and after the DC transition, respectively.

```
o_jumpDetected = 0;
t_envAcombined = max(m_envA,t_envA);
if (t_delta > DCJUMP_MIN_DC_TH )
    if (t_delta> DCJUMP_SENSITIVITY* t_envAcombined)
        o_jumpDetected = 1;
    end
end
```

Figure 4:
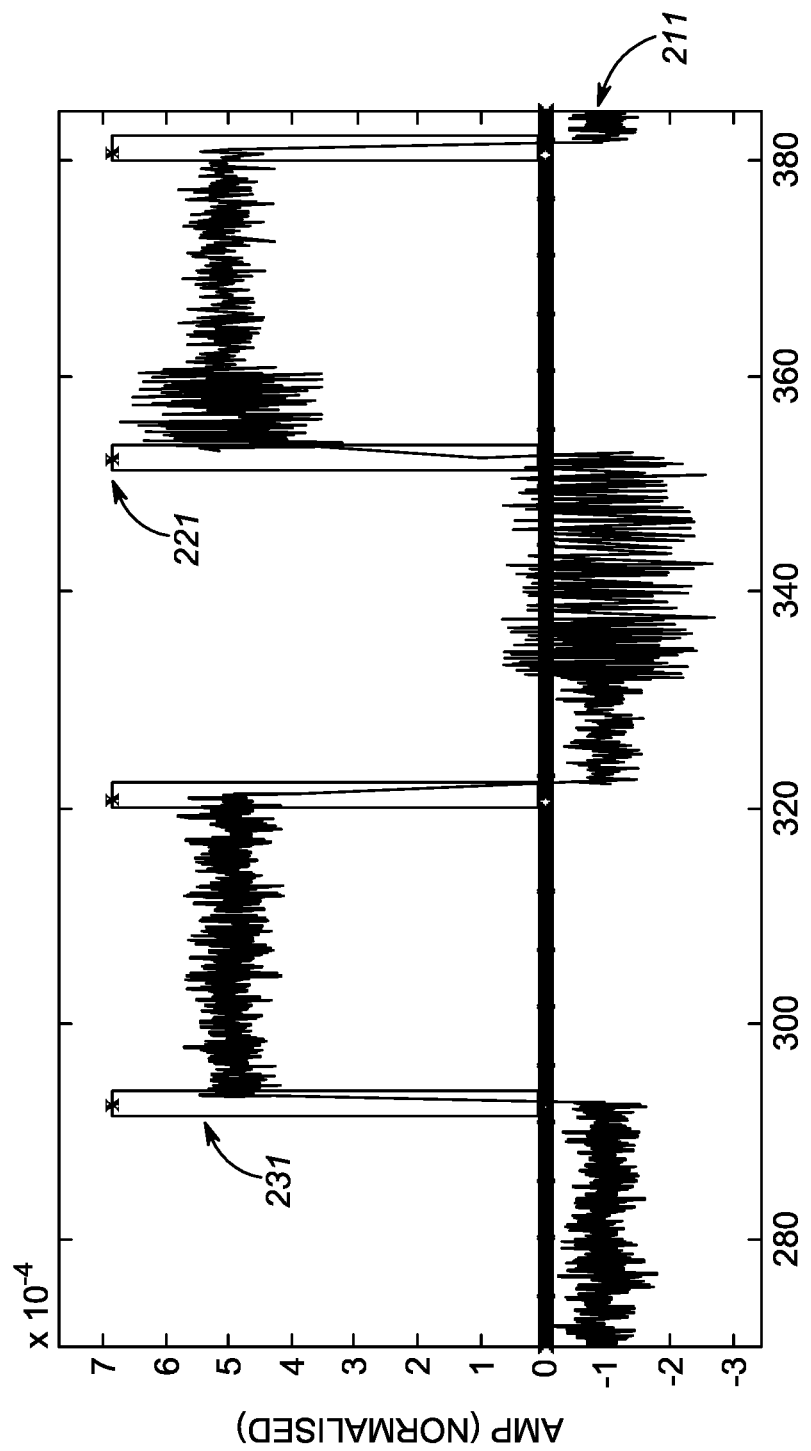
FIG. 4 is a graph of an output of a DC transition detector module of the interferer detector module of FIG. 2, according to an embodiment of the present invention.

FIG. 4 is a graph showing an output 221 of the DC transition detector module 220 and an output 231 of the hysteresis module 230 corresponding to the exemplary substantially baseband current signal 211.

The output 221 of DC transition detector module 220 is high when the DC transitions 222, 222a, 222b are detected. The output 231 of the hysteresis module 230 is determined from the output 221 of DC transition detector module 220. The output 231 of the hysteresis module 230 is high when the output 221 is high.

Figure 5:
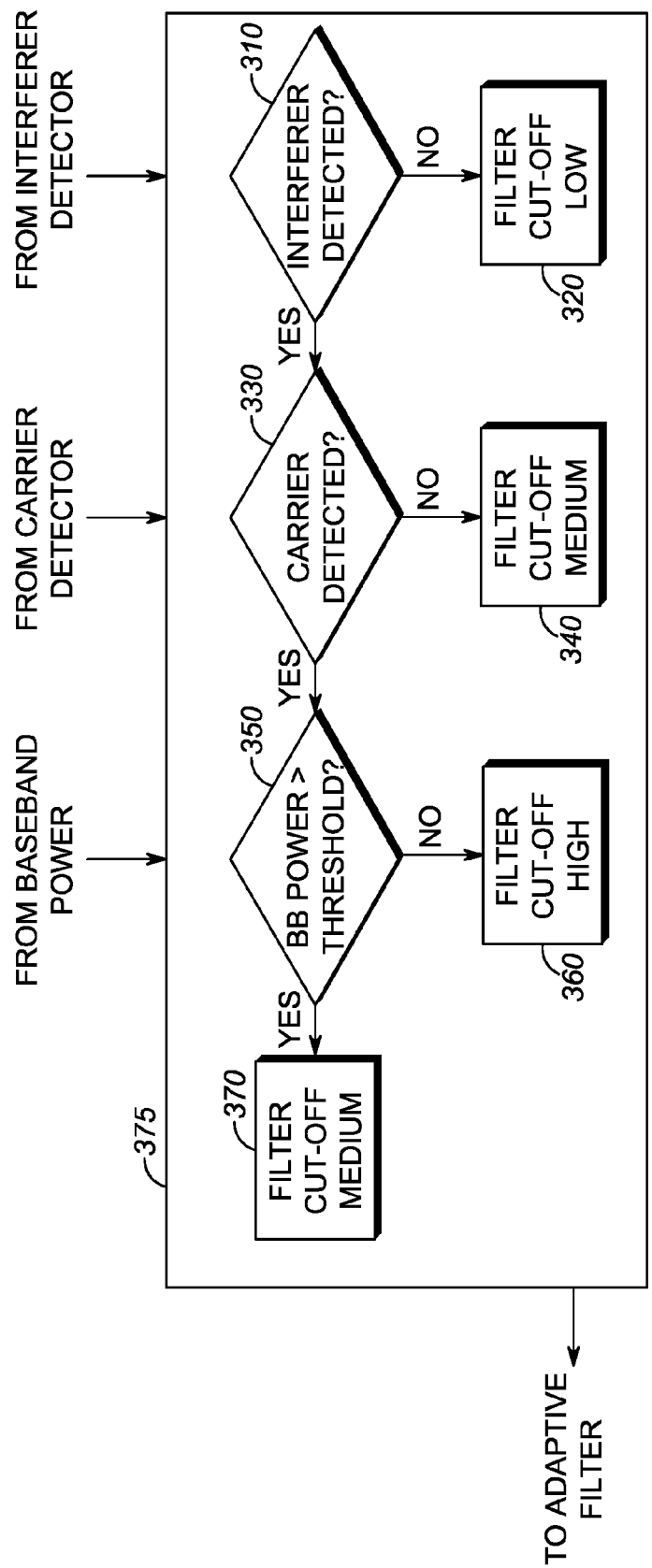
FIG. 5 is a flow diagram of a process of a logic controller module of the RF receiver of FIG. 1, according to an embodiment of the present invention.

FIG. 5 is a flow diagram of a process of a logic controller module 375 according to an embodiment of the present invention. The logic controller module 375 is similar to or identical to the logic controller 175. The logic controller module 375 sets cut-off frequencies of adaptive filters according an output of an interferer detector module, a carrier detector module, and/or a baseband power module.

At block 310, if an interferer is not detected by the interferer detector module and/or the off-channel interferer detector, then a low filter cut-off frequency is set for the adaptive filters at block 320. If an interferer is detected at block 310, the method proceeds to block 330.

At block 330, if a carrier is not detected, then a medium filter cut-off frequency is set for adaptive filters at block 340. If a carrier is detected at block 330, the method proceeds to block 350.

At block 350, if the baseband power is less than a signal power threshold, then a high filter cut-off frequency is set for the adaptive filters at block 360. In one embodiment, a higher filter attenuation is also set for the adaptive filters at block 360.

However, at block 350, if the baseband power is greater than the signal power threshold, then a medium filter cut-off frequency is set for the adaptive filters at block 370.

In one embodiment, the signal power threshold is 95 dBm, the low filter cut-off frequency is 100 Hz, the medium filter cut-off frequency is 600 Hz and the high filter cut-off frequency is 2000 Hz.

In certain embodiments, the adaptive filters comprise a plurality of cascaded infinite impulse response (IIR) filters. The cascaded IIR filters can be single-order IIR filters with 3 dB bandwidth, wherein one IIR filter of an appropriate frequency is selected when setting the adaptive filter to the low cut-off frequency or medium cut-off frequency and two IIR filters of an appropriate frequency are selected when setting the adaptive filter to the high cut-off frequency. The selection of a high cut-off frequency and two IIR filters provides greater attenuation of low-frequency signals to mitigate interference when a low power baseband signal is detected.

In one embodiment, the controller module reconfigures one or more settings of the RF receiver at the portion of the substantially baseband signal including the DC transition or shift. The one or more settings comprise at least one of: gain settings, attenuation settings and DC offset correction settings. The one or more settings are reconfigured to minimize DC distortions, such as DC transitions, at the portion of the substantially baseband signal including the DC transition.

Figure 6:
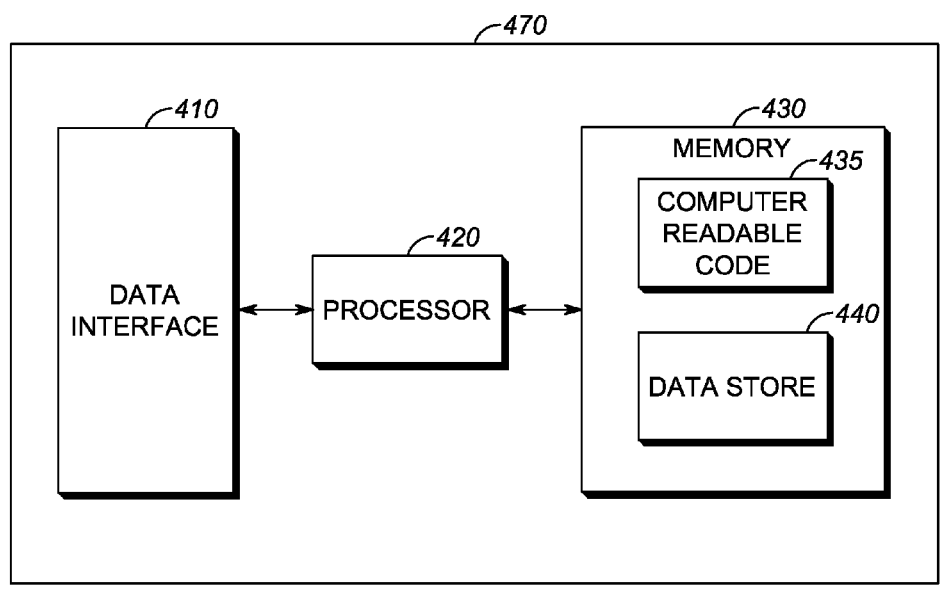
FIG. 6 illustrates a digital signal processing module of the RF receiver of FIG. 1, in accordance with an embodiment of the present invention.

FIG. 6 is a block diagram of a DSP 470, according to an embodiment of the present invention. The DSP 170 can be similar or identical to the DSP 470. The DSP 470 comprises a processor 420 and a memory 430 coupled to the processor 420. The memory 430 includes instruction code 435 for analyzing the substantially baseband signal and the baseband signal, and controlling the RF receiver. In some embodiments the memory 430 comprises the buffer 210 of FIG. 2.

The memory 430 includes a data store 440. The data store 440 includes data, such as the predefined threshold or any other persistent data. As will be understood by a person skilled in the art, a single memory, such as the memory 430, can be used to store both dynamic and static data.

One or more interfaces 410 are coupled to the processor 520 to couple one or more components of the receiver to the DSP 470. The one or more interfaces 410 provide an interface to the ADCs, the adaptive filters, the VLIF translation module and the off-channel interferer detector.

The processor 420 processes computer readable program code components stored in the memory 430 and implements various methods and functions of the RF receiver 100 as described herein. Examples of functions include detecting DC transitions, detecting off-channel interferers, reconfiguring adaptive filters and adjusting the gain, attenuation and DC offset correction settings of the RF receiver.

The processor 420 and memory 430 can be replaced by dedicated hardware, and the DSP 470 can include software, hardware, firmware, or any combination thereof.

The structure of system memory 430 is well known to those skilled in the art and can include a basic input/output system (BIOS) stored in a read only memory (ROM) and one or more program modules such as operating systems, application programs and program data stored in random access memory (RAM).

Although the above embodiments are described with reference to a VLIF receiver, a person of ordinary skill in the art will readily appreciate that the teachings herein can be applied to other types of RF receivers, such as direct conversion receivers and/or zero-intermediate frequency receivers.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of controlling a radio frequency (RF) receiver, the method comprising:
    receiving an RF signal;
    down-converting the RF signal to an intermediate frequency (IF) to produce an IF signal;
    detecting one or both of an off-channel interference signal in the RF signal and a direct current (DC) shift in the IF signal;
    determining a first filter setting according to the detected one or both of the off-channel interference signal and the DC shift; and
    filtering the IF signal using the first filter setting; and
    further comprising filtering the IF signal using a second filter setting when an off-channel interference signal and a DC shift are not detected.

2. The method of claim 1, wherein the IF signal is a baseband signal.

3. The method of claim 1, wherein the first filter setting and/or the second filter setting comprise one or more of a cutoff frequency, an order, a gain, and a structure of a high pass filter.

4. The method of claim 1, wherein the first filter setting has one or more of a higher cutoff frequency and a higher attenuation at DC than the second filter setting.

5. The method of claim 1, wherein:
    filtering the IF signal using the first filter setting comprises filtering the IF signal with a first set of cascaded infinite impulse response (IIR) filters from a plurality of cascaded IIR filters; and
    filtering the IF signal using the second filter setting comprises filtering the IF signal with a second set of cascaded IIR filters from the plurality of cascaded IIR filters.

6. The method of claim 1, wherein detecting the off-channel interference signal comprises:
    determining that a power of the off-channel interference signal is greater than a power threshold.

7. The method of claim 1, further comprising measuring a power of at least a part of the IF signal, wherein the first filter setting is further determined according to the measured power.

8. The method of claim 1, further comprising detecting a presence of a carrier in the RF signal, wherein the first filter setting is further determined according to the presence of the carrier.

9. The method of claim 1, wherein detecting a DC shift in the IF signal comprises determining that a level of the DC shift is greater than a DC shift threshold.

10. The method of claim 1, wherein filtering the IF signal produces a filtered IF signal and wherein the method further comprises down-converting the filtered IF signal to a baseband signal.

11. The method of claim 1, wherein the RF receiver is a very low intermediate frequency (VLIF) receiver.

12. The method of claim 1, wherein the RF receiver is a direct conversion receiver (DCR) and/or a zero intermediate frequency receiver.

13. The method of claim 1, further comprising digitizing the IF signal to produce a digital IF signal and wherein detecting comprises detecting a DC shift in the digital IF signal.

14. The method of claim 1 further comprising:
reconfiguring one or more settings of the RF receiver at a portion of the intermediate frequency signal including the DC shift.

15. A method of controlling a radio frequency (RF) receiver, the method comprising:
receiving an RF signal;
down-converting the RF signal to an intermediate frequency (IF) to produce an IF signal;
detecting one or both of an off-channel interference signal in the RF signal and a direct current (DC) shift in the IF signal;
determining a first filter setting according to the detected one or both of the off-channel interference signal and the DC shift; and
filtering the IF signal using the first filter setting; wherein detecting a DC shift in the IF signal comprises detecting a transition in a DC component of the IF signal that is greater than a threshold, wherein the threshold is defined according to a difference between a maximum amplitude component and a minimum amplitude component of an in-phase component or a quadrature component of a non-transitional portion of the IF signal.

16. A method of controlling a radio frequency (RF) receiver, the method comprising:
receiving an RF signal;
down-converting the RF signal to an intermediate frequency (IF) to produce an IF signal, wherein the RF signal is down-converted into a down-converted in-phase (I) component and a down-converted quadrature component and wherein;
detecting one or both of an off-channel interference signal in the RF signal and a direct current (DC) shift in the IF signal by detecting a DC shift comprises detecting a DC shift in each of the I component and the Q component;
determining a first filter setting according to the detected one or both of the off-channel interference signal and the DC shift.

17. A radio frequency (RF) receiver comprising:
an antenna that is configured to receive an RF signal;
a local oscillator that is configured to down-convert the RF signal to a substantially baseband signal;
an adaptive filter configured to filter the substantially baseband signal, wherein the adaptive filter is a high-pass filter and wherein the filter comprises a plurality of cascaded infinite impulse response (IIR) filters;
a processor, coupled to the local oscillator and the adaptive filter; and
a memory coupled to the processor, the memory comprising instruction code that, when executed by the processor, cause the processor to:
detect one or both of an off-channel interference signal in the RF signal and a direct current (DC) transition in a portion of the substantially baseband signal;
determine a first filter setting according to the detected one or both of the off-channel interference signal and the DC shift; and
configure the adaptive filter to filter the substantially baseband signal using the first filter setting.

18. A radio frequency (RF) receiver comprising:
an antenna that is configured to receive an RF signal;
a local oscillator that is configured to down-convert the RF signal to a substantially baseband signal;
an adaptive filter configured to filter the substantially baseband signal;
a processor, coupled to the local oscillator and the adaptive filter; and
a memory coupled to the processor, the memory comprising instruction code that, when executed by the processor, cause the processor to:
detect one or both of an off-channel interference signal in the RF signal and a direct current (DC) transition in a portion of the substantially baseband signal;
determine a first filter setting according to the detected one or both of the off-channel interference signal and the DC shift;
configure the adaptive filter to filter the substantially baseband signal using the first filter setting;
wherein the memory further comprises instruction code that, when executed by the processor, cause the processor to one or more of:
detect a presence of a carrier in the RF signal and measure a power of the substantially baseband signal;
configure the adaptive filter to operate in a first filter configuration at the portion of the substantially baseband signal including the DC transition by selecting a first set of cascaded infinite impulse response (IIR) filters from the plurality of cascaded IIR filters; and
configure the adaptive filter to operate in a second filter configuration at a portion of the substantially baseband signal not including the DC transition by selecting a second set of cascaded IIR filters from the plurality of cascaded IIR filters.

* * * * *